Oct. 26, 1965  E. J. ZAHURANEC ETAL  3,214,195
COUPLING DEVICE FOR INTERCONNECTING MULTIPLE FLUID LINES
Filed May 25, 1962  5 Sheets-Sheet 2

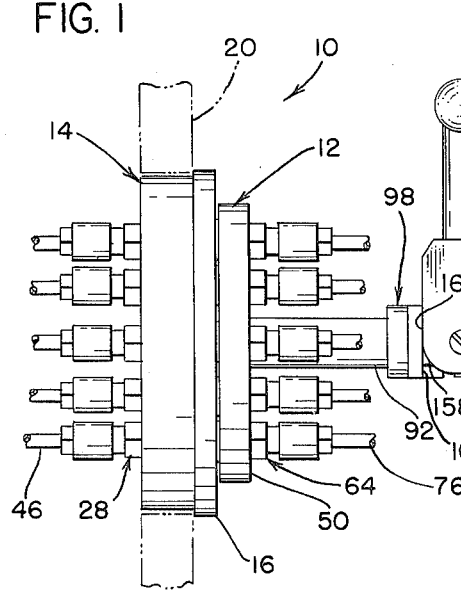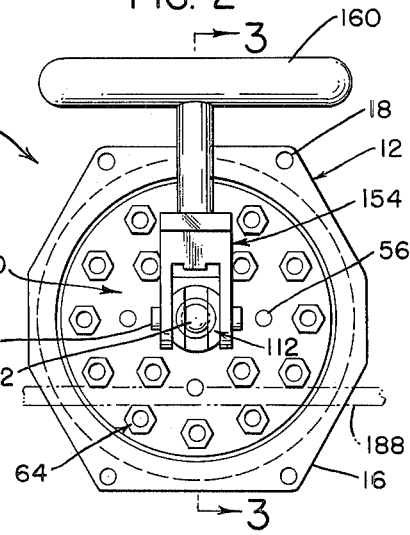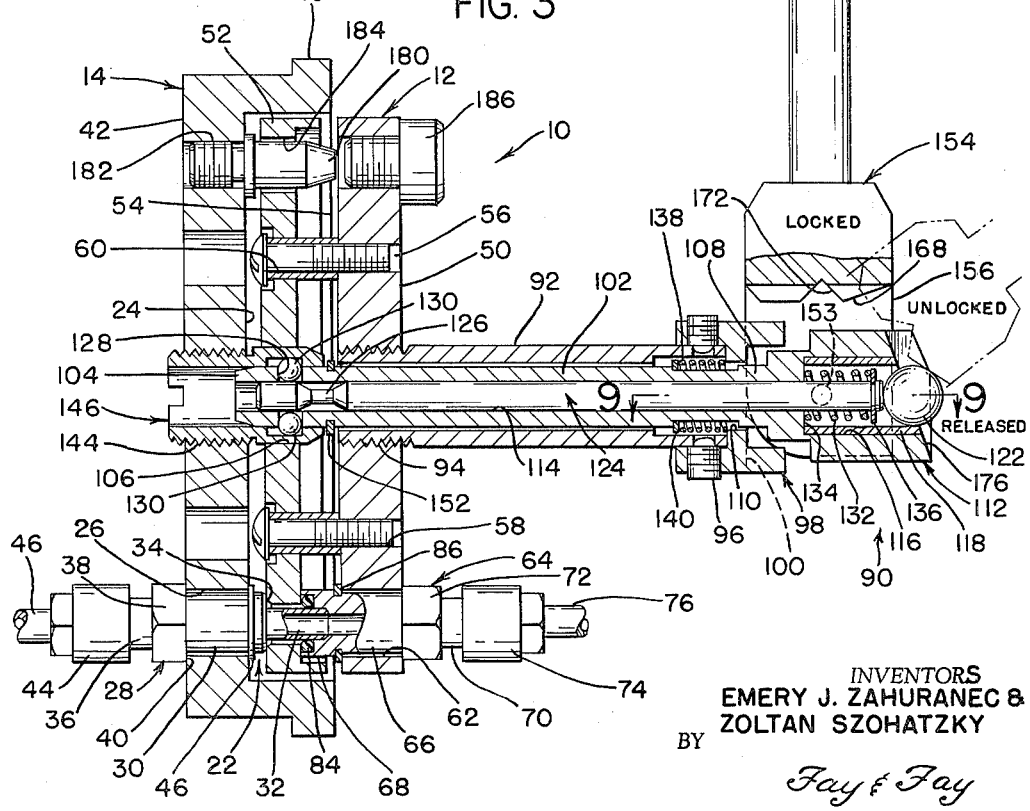

INVENTORS
EMERY J. ZAHURANEC &
BY ZOLTAN SZOHATZKY

*Fay & Fay*
ATTORNEYS

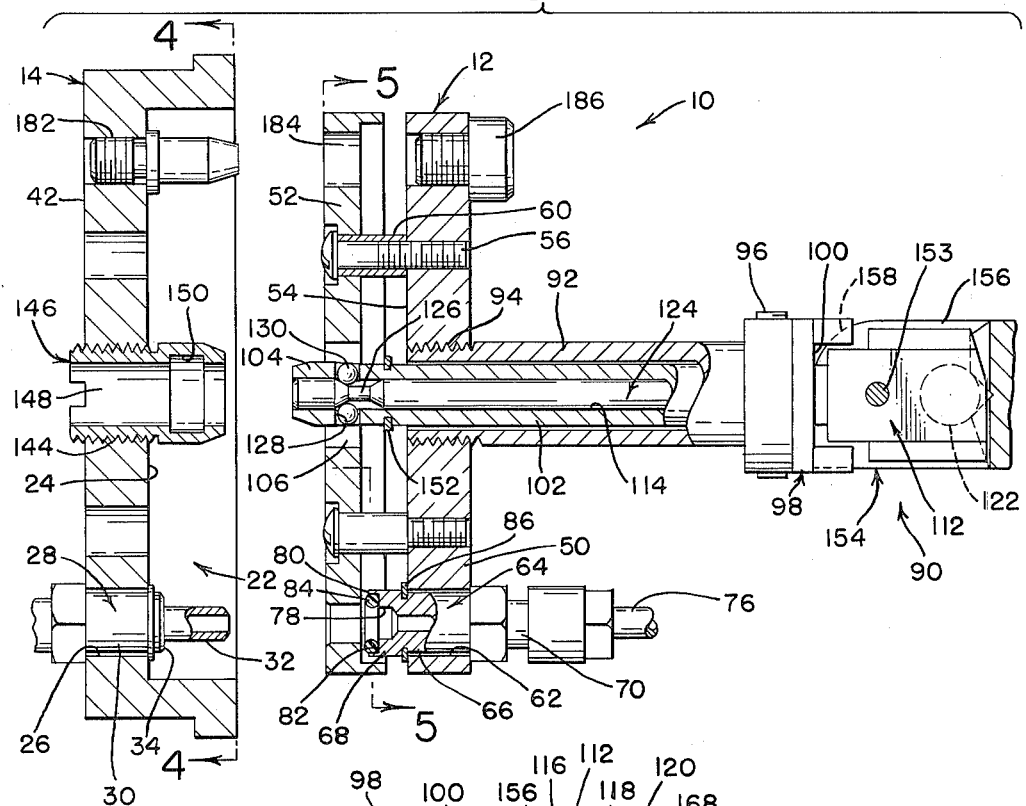
FIG. 7
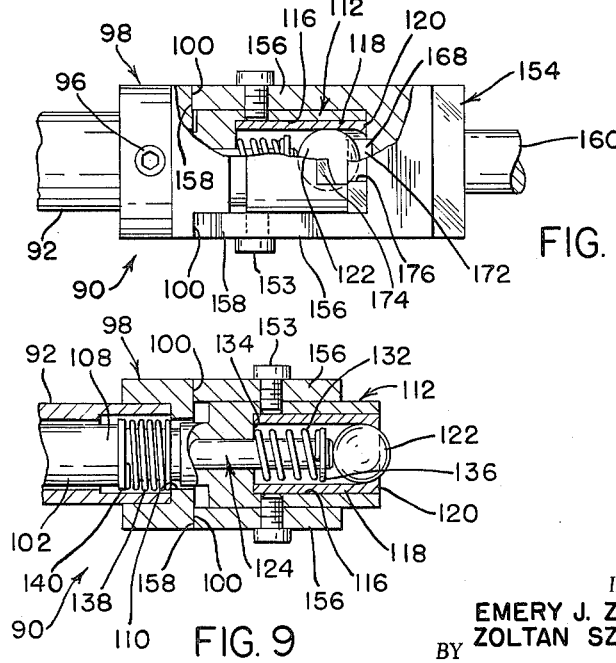
FIG. 8
FIG. 9
INVENTORS
EMERY J. ZAHURANEC &
ZOLTAN SZOHATZKY
BY Fay & Fay
ATTORNEYS Oct. 26, 1965     E. J. ZAHURANEC ETAL     3,214,195
COUPLING DEVICE FOR INTERCONNECTING MULTIPLE FLUID LINES
Filed May 25, 1962     5 Sheets-Sheet 4

INVENTORS
EMERY J. ZAHURANEC &
ZOLTAN SZOHATZKY
BY
*Fay & Fay*
ATTORNEYS

United States Patent Office 3,214,195
Patented Oct. 26, 1965

3,214,195
COUPLING DEVICE FOR INTERCONNECTING
MULTIPLE FLUID LINES
Emery J. Zahuranec, Bedford, and Zoltan Szohatzky, Cleveland, Ohio, assignors to Crawford Fitting Company, Cleveland, Ohio, a corporation of Ohio
Filed May 25, 1962, Ser. No. 197,713
10 Claims. (Cl. 285—27)

This invention is concerned with coupling devices having particularly useful application in connecting together a multiplicity of noncommunicating fluid lines and, more specifically, it is concerned with a coupling device of that type commonly referred to as a quick-connect.

The relatively rapid expansion of the processing and instrumentation industries over the past few years has underlined the need for a coupling device which may be used in simultaneously connecting and disconnecting a multiplicity of fluid conducting lines. In these industries, it is often necessary to couple a large number of relatively small lines used in feeding gauges, metering apparatus, test equipment, process control devices and other instruments of the type commonly used in connection with large control panels and the like.

In the case of complex panels, test chambers and so on, scores of feed lines and other fluid conduits may form a part of the system. It is necessary in systems of this type to connect and disconnect these fluid feed lines for purposes of cleaning, maintenance and replacement of various system components and test fixtures. Usually, this necessity is repeated with a relatively high degree of frequency.

In the past, it has not uncommonly been the case to fit each line with one or more separate connectors. Obviously, the task of connecting and disconnecting a number of such lines each time it is necessary to do so can and does reach sizeable proportions in terms of time expenditure and human effort. This unhappy fact is reflected in the high cost of operation and maintenance.

In order to conserve time and effort in coupling and uncoupling multiple lines of the type described, this invention contemplates the use of appropriate means by which a single coupling device may be used for the purpose of connecting and disconnecting plural lines, thus to minimize the problems which have heretofore prevailed in operating and maintaining complex fluid handling equipment and installations of the type prevalent in instrumentation, processing and testing environments.

While multiple line connectors broadly have formed a part of the known technology for some time, it is common knowledge that the devices presently in use are not particularly well adapted to satisfy the rather demanding requirements of the highly sophisticated environments in which multiple line connectors have present day application.

The inadequacies of known multiple line connector designs stem from one or more of a relatively large number of factors depending upon the particular circumstances of each case but, generalizing it may be said that these designs are not sufficiently refined to satisfy the exacting set of parameters within which they must function.

Perhaps one of the most common shortcomings of prior art designs is to be found in the lack of sufficiently positive sealing characteristics to provide requisite dependability. Difficulty in obtaining needed alignment between a multiplicity of corresponding male and female fluid conducting members has also been a consistent problem relative to reducing coupling size to a minimum and to the provision of suitable means for locking together and unlocking coupling parts.

With the foregoing considerations in mind, it is a general object of the invention to provide a coupling device suitable for connecting and disconnecting at will a multiplicity of fluid lines in an efficient and orderly manner.

It is a more detailed object of the invention to provide in a coupling device of the type described suitable means for correcting alignment problems relative to a multiplicity of cooperating male and female fluid conducting members.

It is a further object of the invention to provide, in a coupling device for multiple fluid lines, appropriate means for affecting a positive leak-tight seal about each fluid conducting member.

More specifically, it is an object of the invention to provide a device of the type described means responsive to the drawing together of the coupling members to compress elastomer sealing means about associated fluid conducting members to insure a positive seal.

It is another object of the invention to provide in a device of the type described suitable actuating or operating means sequentially to lock and draw coupling members together thereby to compress an elastomer sealing means and affect a leak-tight seal.

It is an even further object of the invention to provide a coupling device for multiple fluid lines which is so constructed as to insure requisite orientation between the coupling parts of each individual fluid line, thereby to avoid inadvertent and unintended fluid conducting communication between specific lines.

It is an additional object of the invention to provide a device for coupling multiple fluid lines which permits a maximum number of lines to be connected using coupling members of minimum size.

Other objects and advantages of the invention will be apparent from the detailed description to follow.

Referring now to the drawings in which coupling designs are disclosed embodying the inventive principles herein discussed:

FIG. 1 is a side elevation of a coupling device for multiple fluid lines showing the coupling parts in the connected and locked position;

FIG. 2 is a front elevation of the coupling device shown in FIG. 1 and showing in phantom the manner in which elongated holding tool means may be inserted between adjacent fluid conducting members to maintain them against rotation during take up of the coupling nut means;

FIG. 3 is an enlarged view partly in section taken along lines 3—3 of FIG. 2;

FIG. 7 is a view similar to FIG. 6 showing the coupling members detached from one another;

FIG. 8 is a fragmentary plan view with parts broken away and taken on line 8—8 of FIG. 6;

FIG. 9 is a fragmentary sectional view taken on line 9—9 of FIG. 3;

Figure 4:
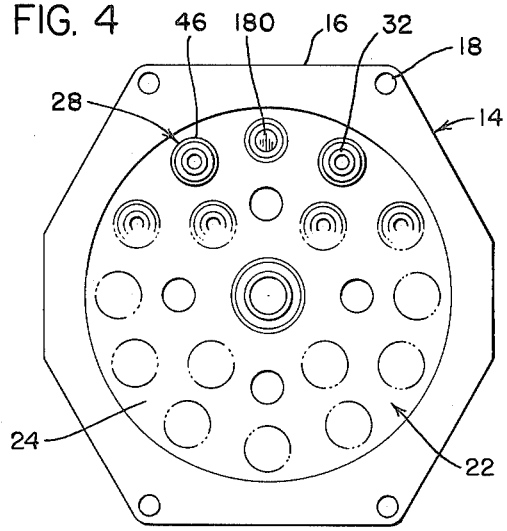
FIG. 4 is a front view of one of the coupling members taken on line 4—4 of FIG. 7.
Figure 5:
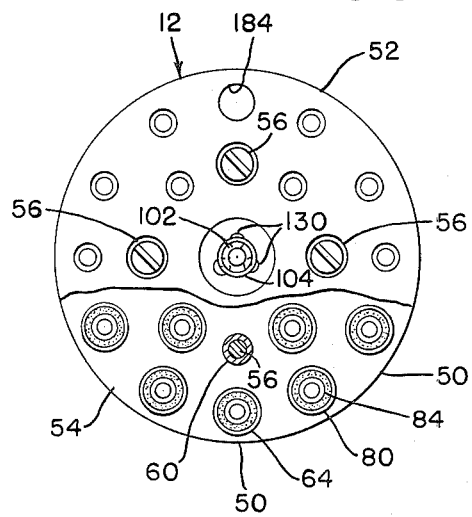
FIG. 5 is a front view of the other coupling member taken on line 5—5 of FIG. 7.

Referring now more particularly to the drawings, we have shown in FIGS. 1–9 one preferred coupling design embodying the principles of the invention. In these figures will be seen a coupling device indicated generally at 10 for connecting multiple fluid lines, and including a pair of male and female coupling members 12 and 14, respectively. If desired, the female coupling member 14 may be provided with a suitable external flange as at 16 having spaced fastener receiving apertures 18 for mounting, in cooperation with suitable fasteners (not shown), such member to a panel, bulkhead or the like shown in phantom at 20 in FIG. 1.

The female coupling member 14 is provided with a generally axial inwardly extending socket 22 having transverse bottom wall defining means 24 at its inner end.

A number of apertures formed on axes generally parallel to the axis of the female coupling member 14 extend through the transverse bottom wall defining means 24 as seen at 26. In each such aperture may be mounted a male nipple member 28. The central portion 30 of each male nipple member is disposed within its associated aperture 26 and preferably is so proportioned relative to such aperture as to provide a clearance of sufficient magnitude to allow limited lateral translation of the nipple relative to the female coupling member 14.

Projecting longitudinally forwardly of the central portion 30 is a portion 32 of reduced diameter and joined to the central portion by means of a radial shoulder 34. This reduced diameter portion 32 is adapted to be received within a female fluid conducting member to be described subsequently.

At the other end of the central portion 30 is a longitudinally rearwardly projecting portion 36 provided with enlarged diameter tool pad means 38 joined to the central portion 30 by means of a radial shoulder 40 which engages the rear face 42 of the transverse bottom wall defining means 24. At its free end the portion 36 is provided with appropriate coupling means 44 for connecting to the male nipple member a fluid conducting line 46.

A lock ring 46 encircles the central portion 30 of the male nipple member adjacent the transverse bottom wall 24 and in cooperation with the tool pad means 38 maintains the male nipple member against displacement from the aperture 26. Particularly useful for this purpose is a crescent ring because it permits a slight degree of angular movement of the male nipple member relative to the female coupling member 14 to accommodate slight misalignment of male and female fluid conducting members.

The male coupling member 12 includes a transverse base plate member 50 and a coaxial compression plate member 52 generally parallel to the base plate 50 but spaced forwardly therefrom along the axis of the male coupling member. At least the compression plate member 52 is of a size to be received in the socket 22 of the female coupling member 14, and when so received both the compression plate member 52 and the base plate member 50 are generally coaxial with the female coupling member 14 and in general parallelism with the transverse bottom wall defining means 24 of the socket 22.

As will be observed, the base plate member 50 defines a transverse end wall 54 opposed to the bottom wall defining means 24 of the socket 22 and substantially parallel thereto. The compression plate member 52 is disposed between these two wall defining means and is mounted upon base plate member 50 for limited axial movement toward and away from the transverse end wall 54. Any suitable means may be used for this purpose, although I have shown in the illustrated embodiments a plurality of elongated headed machine bolts 56 screwed into threaded apertures 58 passing through base plate member 50. A sleeve 60 disposed about a shank of each bolt 56 engages at opposite ends the head and the transverse end wall 54 of the base plate 50 to insure proper spacing between compression plate member 52 and base plate member 50.

A plurality of apertures 62 extend through the base plate member 50 in coaxial relationship, when the device is coupled, with the apertures 26 in the female coupling member 14. Carried in each aperture 62 is a female fluid conducting member 64 having a central portion 66 disposed within the aperture 62 and a portion 68 extending longitudinally forwardly from the transverse end wall defining means 54 of the base plate 50. Portion 70 extends rearwardly from the base plate member 50 and is provided adjacent the rear face of such member with enlarged diameter tool pad means 72. Suitable coupling means 74 is provided for attaching an appropriate fluid line 76 to the female fluid conducting member 64. The forwardly extending portion 68 of the female fluid conducting member 64 is counterbored as at 78 to receive snugly the forwardly extending portion 32 of the cooperating male nipple member 28. The end face 80 of each female fluid conducting member, as will be seen in FIGS. 6 and 7, initially terminates short of the opposed compression plate member 52, but is subsequently brought substantially into engagement therewith upon take up of the coupling device. The end face 80 may, where desirable, provide a suitable annular groove 82 to receive elastomer sealing means 84.

A suitable lock ring 86, preferably of the crescent variety, is employed to hold each female fluid conducting member within its associated aperture in the base plate member and, as will be noted, suitable clearances are provided between the apertures and female fluid conducting members so as to allow for limited lateral and angular movements, thereby to accommodate misalignment of the female fluid conducting members relative to the male nipple members.

In the illustrated embodiments, it will be noted that the elastomer sealing means 84 in the free state extends longitudinally beyond the end face 80 of its associated nipple so as to be substantially compressed by movement of the compression plate member 52 in the direction toward transverse end wall 54.

Operating means, indicated generally at 90, is employed for locking the coupling members together and for drawing the compression plate member 52 toward the transverse end wall defining means 54 of the base plate member 50, thereby to compress the elastomer sealing means 84 and perfect leak-tight joints between each male and female fluid conducting member. The operating means includes an elongated outer sleeve 92 attached to the base plate 50 centrally thereof as by means of cooperating threads 94.

Attached at the free end of the outer sleeve 92 as by means of set screws 96 or the like is a cam shoe 98 providing bearing surfaces 100. A concentric inner sleeve 102 is slidably received within the outer sleeve 92. The forward end 104 of the inner sleeve projects longitudinally beyond the base plate and compression plate members 50 and 52, respectively, through coaxial aperture 106 provided in the compression plate member 52.

The rearward end 108 of the inner sleeve 102 projects longitudinally beyond the rearward end of the outer sleeve 92 through coaxial aperture 110 provided in the cam shoe 98. Affixed to the rearward end 108 of the inner sleeve 102 is a housing member 112 having concentric bores and counterbores 114 and 116, respectively, generally coaxial with the inner and outer sleeves 102 and 92, respectively.

Counterbore 116 forms a chamber within which a hollow bushing member 118 is received. Suitable indention means 120 are formed at the rearward terminus of the bushing to retain within the bushing a loosely mounted ball 122. An elongated rod 124 is slidably received within inner sleeve 102, and at its forward end portion is provided with a circumferential groove 126 adapted upon reciprocation of the rod 124 to move into and out of communication with spaced radial openings 128 provided in the forward end portion of the inner sleeve 102. Disposed within each radial opening 128 is a suitable detent member 130.

The rearward end portion of rod 124 extends through bore 114 into the hollow bushing member 118 to engage ball 122. Compression spring 132, at one end, engages radial shoulder 134 on the housing member 112, and at the other, snap ring 136 on rod 124 normally to bias the rod axially rearwardly. At the same time compression spring 138 engages flange 140 on the inner sleeve 102 and external flange 140 on the inner sleeve 102 and internal flange 142 on cam shoe 98 to bias normally the inner sleeve 102 axially forwardly.

Figure 6:
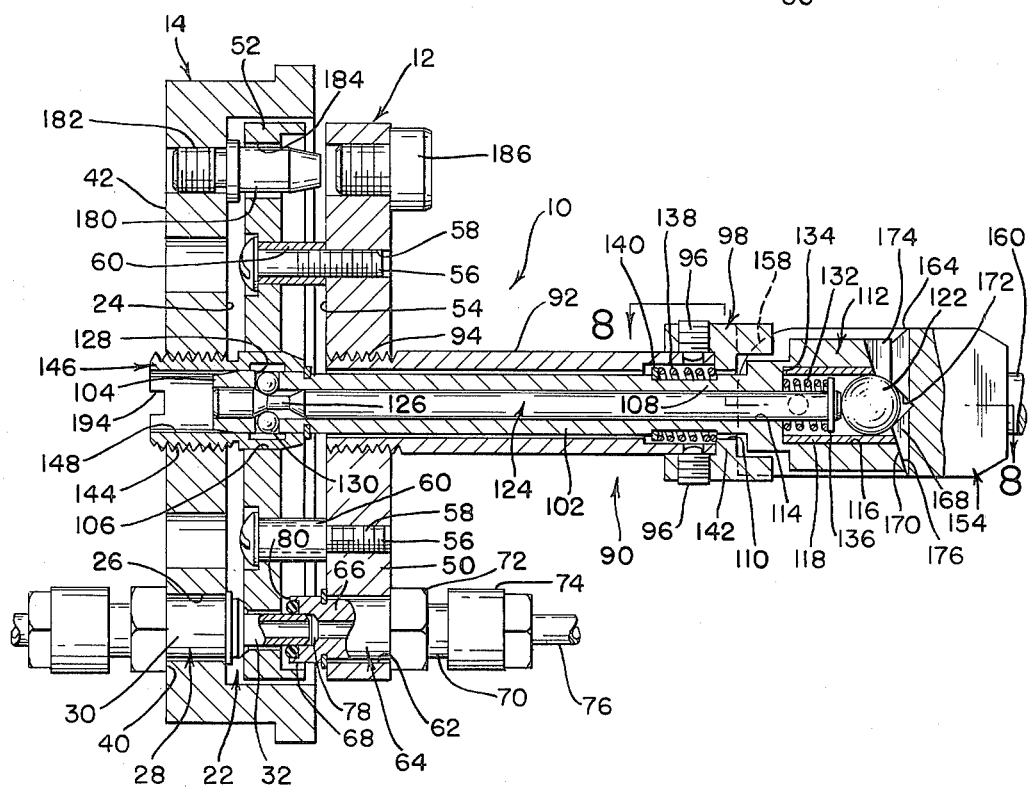
FIG. 6 is a view similar to FIG. 3 showing the coupling members telescoped prior to actuation of the operating means to lock the members together and to draw them toward one another to compress the sealing means.
Figure 10:
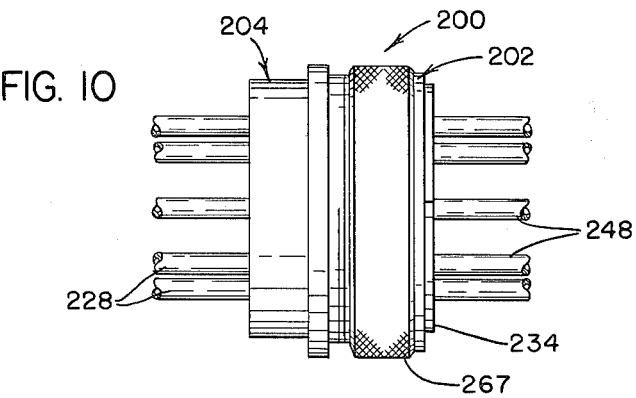
FIG. 10 is a side elevation of a modified coupling design embodying the principles of the invention.

Centrally mounted to the female coupling member 14 by cooperating threads 144 or the like is a hub 146 having a bore 148 therethrough in coaxial alignment with and of a size snugly to receive the forward end portion of inner sleeve 102 on the male member, as seen in FIGS. 3 and 6. Bore 148 is provided with an annular, inwardly opening detent receiving recess 150 adapted to register with radial openings 128 of inner sleeve 102 when the coupling members are telescoped. Over insertion of the inner sleeve 102 into the bore 148 of hub 146 is prevented by snap ring 152 located at the forward end portion of the inner sleeve. This insures the fact that the radial openings 128 and the detents 130 will always fall into registry with the detent receiving recess 150.

Forming a part of operating means 90 and mounted by pivots 153 to housing 112 for rotation about an axis perpendicular to that of rod 124 and sleeves 92 and 102, is an actuator which includes a body 154 having spaced depending parallel legs 156 which straddle housing 112 and rod 124. The edges of such legs opposed to bearing surfaces 100 on cam shoe 98 are provided with arcuate cam surfaces 158 which engage such bearing surfaces 100 upon rotation of the actuator by means of handle 160.

As will be noted from an examination of the drawings, the radial distance from the pivot axis of the actuator to the end edges 162 of legs 156 is somewhat less than the radial distance to the side edges 164 of such legs. Consequently, rotation of the actuator about its axis from the position shown in FIG. 6, for example, to that shown in FIG. 1 will result in a rearward axial movement of the inner sleeve 102 as the zone of engagement of the edge of each parallel leg 156 with its associated bearing surface 100 moves from end edge 162 along cam surface 158 to side edge 164.

Disposed between legs 156 is a camming member 168 which includes a sloping forward surface 170 and a communicating notch 172. A slot 174 generally coplanar with the camming member 168 is formed in the rearward terminus of the housing 112 to accommodate the camming member when the actuator is in the position shown in FIGS. 6, 7 and 8. The bottom 176 of the slot 174 is formed on an angle generally complementary to that of the sloping forward surface 170 of the camming member 168 so as to provide a stop to limit clockwise rotation of the actuator and, additionally, to insure the fact that the camming member 168 may swing freely in and out of the slot 174 upon rotation of the actuator.

It will be observed that upon clockwise rotation of the actuator, ball 122 will be cammed forwardly as the sloping forward surface 170 moves relative thereto resulting in a forward axial movement of the rod 124 relative to the inner and outer sleeves 102 and 92, respectively. When the sloping forward surface 170 comes into engagement with the bottom wall 176 of the slot 174, rotation of the actuator reaches its clockwise limit and ball 122 becomes releasably locked in notch 172, thereby to hold the rod 124 at the forward extremity of its reciprocation.

To insure proper orientation between corresponding male and female fluid conducting members, a guide or locator pin 180 is mounted upon the female member 114 in the illustrated embodiment as by means of cooperating threads 182 or the like. An aperture 184 is provided in the compression plate member 52 and receives the locator 180 when the coupling members are assembled. In this way, it is impossible to insert the male coupling member into the female coupling member in any way but that originally intended. For convenience, a suitable indicator 186 of colored plastic or the like may be mounted upon the base plate in aligned relationship with the aperture 184 to assist the operator in obtaining proper registration between such aperture and the locator pin 180 during assembly of the coupling members.

An important feature of the invention lies in the manner in which the various male nipple fluid conducting members and, similarly, the female fluid conducting members are oriented relative to one another in order to reduce the over-all size of the fitting components without at the same time reducing the maximum number of male and female fluid conducting members which may be carried by the coupling device. For the sake of simplicity in the drawings, the male nipple members, for example, have been shown as being spaced a considerable distance from one another. In actual practice, however, these members would normally be positioned so close to one another that it would be impossible to apply a wrench to the tool pads 38 in order to hold such members against rotation while coupling nut 44 is being taken up. To avoid this problem, the male nipple members and, similarly, the female fluid conducting nipple members are mounted in relatively closely spaced parallel rows as seen, for example, in FIG. 2. This permits an elongated holding tool means, such as rod 188 shown in phantom in FIG. 2, to be inserted between adjacent rows in the region of tool pad means 38 and thereby simultaneously to lock all the nipple members in each of these two rows against rotation while a suitable socket wrench is utilized to take up coupling nuts 44 which, incidentally, are provided with tool pads having substantially smaller cross-sectional dimensions than those of tool pads 38. It will be understood, of course, that the foregoing principle is applied as well to the female fluid conducting members.

In operation, when it is desired to connect together the male and female coupling members 12 and 14, respectively, and thereby establish fluid communication between the multiplicity of male nipple members and female fluid conducting members, the male and female coupling members 12 and 14 are first aligned with one another as shown in FIG. 7, for example. To aid in such alignment, the operator may avail himself of the indicator 186 and locator means 180. Next, the male and female coupling members 12 and 14 are moved axially toward one another until the male coupling member is positioned within socket 22 of female coupling member 14. Cooperating guide pin 180 and aperture 184 insure the fact that the multiple fluid lines to be connected are properly oriented with respect to one another, thereby to prevent the wrong lines from being coupled to one another.

It will be noted from an observation of FIG. 6 that the compression plate member 52 is at this point of the coupling action engaged by radial shoulders 34 of the male nipple members, but has not as yet been drawn into engagement with sealing means 84. The actuating means is so positioned that ball 122 is maintained in depressed relationship under the influence of camming member 168. As a consequence, spring 132 is compressed and rod 124 is held at the forward extremity of its reciprocal movement in order that detent means 130 may be received in groove 126 to permit the forward end of inner sleeve 102 to be passed into bore 148 of hub 146.

When the coupling components have reached the relative positions shown in FIG. 6, the actuating means 154 is rotated in a counterclockwise direction using handle 160.

During the first few degrees of rotation, ball 122 moves downwardly along sloping forward surface 170 of camming member 168, thereby permitting spring 132 to elongate and draw rod 124 rearwardly, as shown, for example, in FIG. 3. Such rearward movement causes detent means 130 to be cammed from groove 126 radially outwardly into locking engagement with detent receiving recess 150.

Continued counterclockwise rotation of actuating means 154 causes movement of arcuate camming surfaces 158 relative to bearing surfaces 100, thereby to draw inner sleeve 102 and rod 124 rearwardly relative to outer sleeve 90, and base plate member 50. Inasmuch as detent means 130 are now firmly locked within detent receiving recess 150, female coupling member 14 is drawn in the same direction as inner sleeve 102 and rod 124. Radial shoulders 34, in turn, cause movement of compression plate member 52 toward base plate member 12 with a resultant compression of sealing means 84 between the rear face of the compression plate member and end face 80 of female fluid conducting members 64, thereby to effect a seal between such female fluid conducting members and the forward portion 32 of male nipple members 28.

To disconnect the coupling members, actuating means 154 is rotated in a counterclockwise direction from that position shown in FIG. 1, thereby permitting compression spring 138 to elongate and urge inner sleeve 102 and rod 124 forwardly relative to outer sleeve 92 and base plate member 50. This releases compression plate member 52 and permits sealing means 84 to decompress. Continued clockwise rotation of the actuating means causes depression of ball 122 and consequent forward axial movement of rod 124 to bring groove 126 into communication with detents 130 permitting them to move radially inwardly out of locking relationship relative to detent receiving recess 150 in hub 146. Male coupling member 12 is at this point free to be withdrawn from socket 22 of female coupling member 14.

In the event it should be determined that the degree of compression which is exerted upon sealing means 84 by compression plate member 52 is more or less than that desired for optimum performance, a suitable tool may be applied to wrench engaging means 194 to vary the axial position of hub 146 relative to female coupling member 14, thereby to adjust the distance compression plate member 52 is ultimately moved in response to the action of the operating means.

In FIGS. 10–15, we have shown a modified embodiment incorporating various of the principles forming a part of the inventive concept. In these figures, we have shown a coupling device 200 which includes a male coupling member 202 and a female coupling member 204 providing a generally coaxial inwardly extending socket 206 having transverse bottom wall defining means 208. The transverse bottom wall defining means 208 is provided with a multiplicity of apertures 210 formed on axes generally parallel to the central longitudinal axis of the device.

Each aperture 210 is provided with a coaxial counterbore 212 for loosely receiving radial flange 214 of cooperating male fluid conducting nipple member 216, which is provided with a rearwardly extending portion 218 projecting through coaxial aperture 220 provided in retaining plate 222. Lock ring 224 affixed to female coupling member 204 as by means of cooperating threads 226 or the like is employed to hold apertured retaining member 222 firmly against the rearward face of transverse bottom wall defining means 208. Mounted upon the rearward portion 218 of male nipple member 216 is an appropriate fluid line 228. Any suitable connecting means may be employed for establishing the joint between line 228 and rearward portion 218 of the male nipple member. The forward portion 230 of male nipple member 216 projects axially beyond the front face of bottom wall defining means 208 for insertion into a corresponding female fluid conducting member to be described hereinafter.

Male coupling member 202 includes a transverse base plate member 232 in axially spaced opposed substantial parallelism with bottom wall defining means 208 of the female coupling member 204 when the male and female coupling members are connected. Lock ring 234 mounted to retaining ring 236 as by means of cooperating threads 238 or the like is employed to maintain base plate member 232 firmly against internal radial shoulder 240. A multiplicity of apertures 242 are formed in base plate member 232 on axes generally parallel to the central longitudinal axis of the male coupling member and each such aperture loosely receives female fluid conducting member 244.

Each female fluid conducting member 244 is provided with a rearward portion 246 projecting axially rearwardly for connection with a suitable fluid conducting line 248. Forward portion 250 of each female fluid conducting member projects axially forwardly of the base plate member 232 and is provided with radial flange means 252 in engagement with the forward face of base plate member 232 thereby to prevent retrograde movement of the female fluid conducting members.

Compression plate member 254 is carried on the male coupling member in generally coaxial relationship therewith, and generally parallel to base plate 232 but spaced axially forwardly therefrom. As will be observed, annular radial flange 256 of compression plate member 254 is disposed loosely between the forward face of base plate member 232 and internal flange 258 so as to be susceptible to a limited movement toward base plate member 232.

Figure 12:
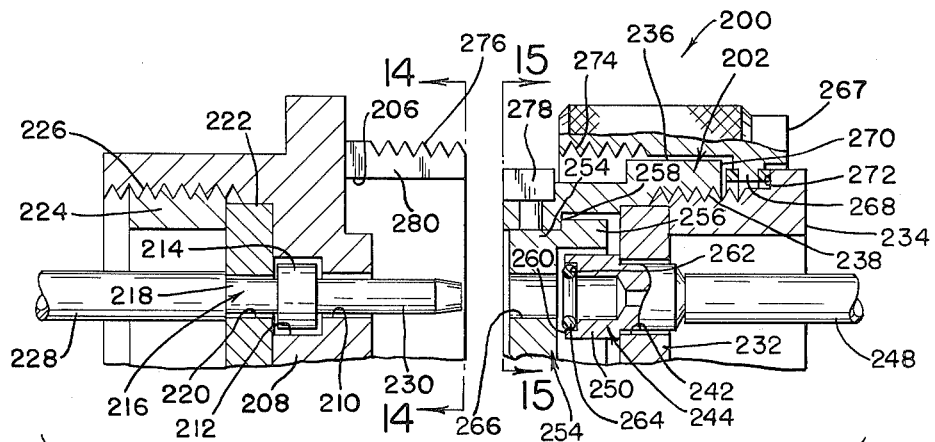
FIG. 12 is a view similar to FIG. 11 showing the coupling members detached from one another.
Figure 13:
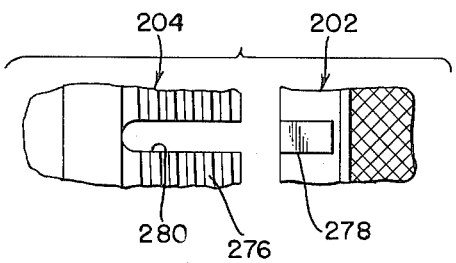
FIG. 13 is a fragmentary plan view of FIG. 12 showing details of the locator or guide means.
Figure 14:
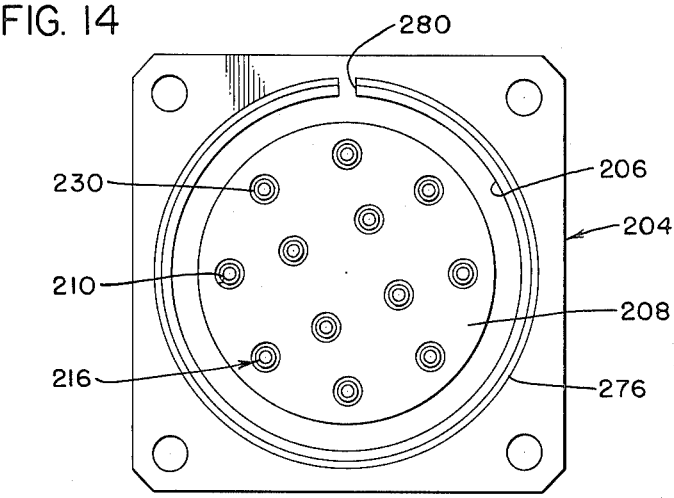
FIG. 14 is a front view of one of the coupling members and is taken on line 14—14 of FIG. 12.
Figure 15:
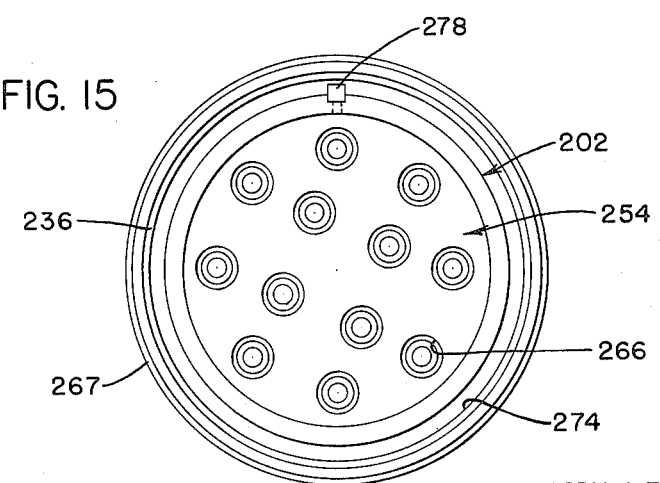
FIG. 15 is a front view of the other coupling member and is taken on line 15—15 of FIG. 12.

End face 260 of each female fluid conducting member terminates short of compression plate member 254 when the male and female coupling members are disconnected as seen, for example, in FIG. 12. Where desired, such end face may be provided with an annular groove 262 to receive elastomer sealing means 264.

Figure 11:
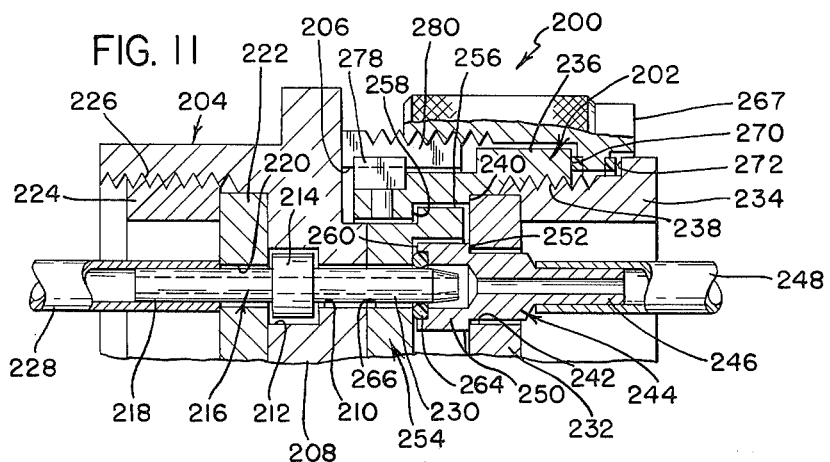
FIG. 11 is an enlarged fragmentary view taken partly in section of the embodiment shown in FIG. 10.

A number of apertures 266 are provided in compression plate member 254 in coaxial alignment with a corresponding female fluid conducting member and are adapted to register with the forward end portion 230 of a corresponding male nipple member when the coupling members are assembled as shown in FIG. 11 so as to permit the forward end portion of such male nipple member to pass therethrough into the corresponding female fluid conducting member.

A suitable coupling nut 267 disposed between axially spaced radial shoulders 270 and 272 on retaining ring 236 and lock ring 234, respectively, may be employed for drawing the male and female coupling members together and for maintaining them in such position. While coupling nut 267 and male and female coupling members 204 have been illustrated as being provided with cooperating thread means 274 and 276, respectively, it will be understood that any equivalent means may be employed, such as bayonets, cams and the like.

To insure proper orientation between the male and female coupling members prior to and during assembly, a suitable guide or locator lug 278 is provided on the forward end of male coupling member 202 for engagement with cooperating longitudinal slot 280 on female coupling member 204.

In operation, when it is desired to connect the male and female coupling members, they are first aligned as seen in FIG. 12 and the male coupling member is subsequently inserted into the socket 206 of the female coupling member, locating lug 278 having been fitted into longitudinally extending slot 280 to insure proper orientation. Subsequently, coupling nut 266 is rotated to bring threads 274 and 276 into engagement, thereby to draw the male and female coupling members toward one another. As such movement progresses, the forward face of bottom wall defining means 208 comes into engagement with the forward face of compression plate member 254, thereby to force the latter toward base plate member 232 to compress elastomer sealing means 264 into leak-tight engagement with the external surfaces of the forward portions 230 of the male nipple members. To disconnect the male and female coupling members, the reverse procedure is followed.

For purposes of simplicity in description, we have shown the inventive concepts of the invention as being embodied in but two concrete examples. It is obvious, however, that the essential inventive principles herein involved may be incorporated into a number of embodiments not illustrated without at the same time departing from the true spirit of the invention. Consequently, it is our desire to be limited only by the scope of the appended claims.

We claim:

1. A device for coupling multiple fluid lines comprising:
   (a) A female coupling member having an inwardly extending socket;
   (b) Transverse bottom wall defining means at the inner end of the socket;
   (c) A male coupling member received within said socket when the coupling members are connected, and provided with transverse end wall defining means opposed to the bottom wall of the socket;
   (d) A plurality of male nipple members generally parallel to the axis of said socket, when the coupling members are connected, said male nipple members being carried by one of said wall defining means and projecting longitudinally therebeyond;
   (e) A fluid passageway extending through each of said male nipple members;
   (f) A plurality of bores provided in the other of said wall defining means and in register with said male nipple members when the coupling members are connected;
   (g) Elastomer sealing means disposed between said end and bottom wall defining means;
   (h) Apertures provided in said elastomer sealing means of a size and shape generally corresponding to that of the male nipple members when the sealing means is in its free state, said male nipple members extending through and beyond corresponding ones of such apertures into corresponding bores of said other wall defining means when the coupling members are connected;
   (i) Means to connect said male nipple members and said bores respectively with appropriate fluid lines;
   (j) Means to draw the coupling members together into connected relationship and to maintain them in that condition, and
   (k) Means interposed between said wall defining means for engagement with said elastomer sealing means and responsive to the drawing together of the coupling members to compress said sealing means against the external surfaces of the male nipple members and thereby establish a fluid-tight seal between the coupling members.

2. A device as defined in claim 1 in which said means interposed between said wall means includes:
   (a) A plate-like member having apertures in register with said bores and said nipple members, said plate-like member being disposed between said elastomer sealing means and the wall defining means which carries the male nipple members, and
   (b) Means mounting said plate-like means for limited movement along the axes of said bores toward the other wall defining means in response to the drawing together of said coupling members into connected relationship.

3. A device for coupling multiple fluid lines comprising:
   (a) A female coupling member having an inwardly extending socket;
   (b) Transverse bottom wall defining means at the inner end of the socket;
   (c) A male coupling member received within said socket when the coupling members are connected, and provided with transverse end wall defining means opposed to the bottom wall defining means of the socket;
   (d) A plurality of male nipple members generally parallel to the axis of said socket, when the coupling members are connected, said male nipple members being carried by one of said wall defining means and projecting longitudinally therebeyond;
   (e) A fluid passageway extending through each of said male nipple members;
   (f) A plurality of bores provided in the other of said wall defining means and in register with said male nipple members when the coupling members are connected;
   (g) Elastomer sealing means disposed between said end and bottom wall defining means;
   (h) Apertures provided in said elastomer sealing means of a size and shape generally corresponding to that of the male nipple members when the sealing means is in its free state, said male nipple members extending through and beyond corresponding ones of such apertures into corresponding bores of said other wall defining means when the coupling members are connected;
   (i) Means to connect said male nipple members and said bores respectively with appropriate fluid lines;
   (j) Detent means carried by the one of the coupling members;
   (k) Detent receiving means provided upon the other of the coupling members for locking engagement with detent means, and
   (l) Operating means for moving said detents into locking engagement with said detent receiving means thereby to lock the coupling members together, and for subsequently applying, through said detents and detent receiving means, axial force to said other coupling member to draw it toward said one coupling member, thereby to compress said elastomer sealing means between said coupling members and against the external surfaces of said male nipple members.

4. A device as defined in claim 3 including:
   (a) Means interposed between said wall defining means for engagement with said elastomer sealing means and responsive to the drawing together of the coupling members to compress said sealing means against the external surfaces of the male nipple members and thereby establish a fluid-tight seal between the coupling members.

5. A device as defined in claim 3 including:
   (a) A plate-like member having apertures in register with said bores and said nipple members, said plate-like member being disposed between said elastomer sealing means and the wall defining means which carries the male nipple members, and
   (b) Means mounting said plate-like means for limited movement along the axes of said bores toward the other wall defining means in response to the drawing together of said coupling members.

6. A device as defined in claim 1 characterized by the fact that the means to draw the coupling members together into connected relationship and to maintain them in that condition comprises:
   (a) Rotatable coupling nut means carried by one coupling member, and
   (b) Means on the other member for locking co-action with said rotatable coupling nut means.

7. A device for coupling multiple fluid lines including:
   (a) First and second coupling members, said first coupling member providing a socket for receiving the other;
   (b) A relatively flat radial surface at the inner end of the socket forming a bottom wall means therefor;

(c) A base plate-like member on said second coupling member providing relatively flat end wall means in generally coaxial parallelism with said bottom wall and in axially spaced opposition therewith;

(d) A relatively flat plate-like compression member interposed between said bottom wall means and said end wall means in generally coaxial parallelism therewith;

(e) A multiplicity of female fluid conducting members carried loosely by one of said wall means in general parallelism with the axis thereof, said female members having end faces in spaced opposition to said plate-like compression member;

(f) A multiplicity of male fluid conducting nipple members carried loosely by other of said wall means in register with said female fluid conducting members;

(g) A multiplicity of apertures in said plate-like compression member in register with said male nipple members, said male nipple members being passed through corresponding ones of said apertures into said female members when the coupling members are connected;

(h) Means mounting said plate-like compression member for limited axial movement toward said one wall means, said compression member being carried by the coupling member upon which said female members are mounted;

(i) Elastomer sealing means disposed between said plate-like compression members and said end faces of said female members;

(j) Apertures provided in said elastomer sealing means coaxial with said female members and means corresponding in size and shape to said male nipple members when the sealing means is in its free state, and (k) Means to lock said first and second coupling members together and to draw said plate-like compression member toward said one wall means thereby to compress said elastomer sealing means into lock-tight engagement with said male nipple members and the said female members.

8. A device as described in claim 7 in which said means to lock said first and second coupling members together and to draw said plate-like compression member toward said one wall means includes:

(a) Rotatable coupling nut means carried by one coupling member, and (b) Means on the other member for locking co-action with said rotatable coupling nut means.

9. A device as defined in claim 7 in which said means to lock said first and second coupling members together and to draw said plate-like compression member toward said one wall means includes:

(a) Detent carrying sleeve means on one of said coupling members;

(b) Detent carrying sleeve means on one of said coupling members;

(c) Detent means carried by said detent carrying sleeve means and in register with detent receiving means when the coupling members are connected together;

(d) First cam means for moving said detent receiving means into and out of locking engagement with said detent receiving means;

(e) Second cam means for drawing said coupling members together after movement of said detent means into locking engagement with said detent receiving means, and (f) Actuating means for sequentially operating said first and second cam means respectively to lock said coupling members and to draw them together.

10. A device as described in claim 7 characterized by the fact that:

(a) At least some of said fluid conducting members are provided with coupling nut means operative upon rotation relative to corresponding ones of said fluid conducting members to connect such fluid conducting members to appropriate corresponding fluid lines, and that (b) Tool pad means are provided on adjacent ones of said fluid conducting members, said tool pad means being positioned in laterally spaced opposition to one another, whereby an elongated holding means may be inserted between such adjacent fluid conducting members in simultaneous functional engagement with the tool pad means of each to lock said fluid conducting members against rotation during take up of said coupling nut means.

References Cited by the Examiner

UNITED STATES PATENTS

| | | | |
|---|---|---|---|
| 707,966 | 8/02 | Gordon. | |
| 990,070 | 4/11 | Sheldon | 285—25 |
| 1,198,705 | 9/16 | Davis | 285—25 |
| 1,596,024 | 8/26 | Robinson | 285—25 |
| 1,879,364 | 9/32 | Lomar | 285—314 |
| 2,186,082 | 1/40 | Tamminga. | |
| 2,447,185 | 8/48 | Keim | 285—137 X |
| 2,724,093 | 11/55 | Preston. | |
| 2,768,434 | 10/56 | Taylor | 29—526 |
| 2,786,383 | 3/57 | Bachman. | |
| 2,788,991 | 4/57 | Neuhauser | 285—137 |
| 2,837,749 | 6/58 | Gross | 285—137 X |
| 2,858,848 | 11/58 | Writtren | 280—421 |
| 2,965,136 | 12/60 | Burris | 285—137 |
| 3,011,805 | 12/61 | Johnson | 285—312 |
| 3,030,705 | 4/62 | Gill | 29—526 |
| 3,052,863 | 9/62 | Uberbacher | 339—45 |

FOREIGN PATENTS 929,570  6/63  Great Britain.

CARL W. TOMLIN, *Primary Examiner.*